(12) United States Patent
Dwivedi et al.

(10) Patent No.: US 11,928,719 B2
(45) Date of Patent: Mar. 12, 2024

(54) FACILITATING USER SELECTION USING TREND-BASED JOINT EMBEDDINGS

(71) Applicant: International Business Machines Corporation, Armonk, NY (US)

(72) Inventors: Satyam Dwivedi, Bangalore (IN); Vijay Ekambaram, Chennai (IN); Kushagra Manglik, Lucknow (IN); Nupur Aggarwal, Bangalore (IN); Vikas C. Raykar, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 116 days.

(21) Appl. No.: 17/543,239

(22) Filed: Dec. 6, 2021

(65) Prior Publication Data
US 2023/0177582 A1 Jun. 8, 2023

(51) Int. Cl.
| | |
|---|---|
| *G06Q 30/00* | (2023.01) |
| *G06F 40/40* | (2020.01) |
| *G06Q 30/0601* | (2023.01) |
| *H04L 51/046* | (2022.01) |

(52) U.S. Cl.
CPC ........ *G06Q 30/0631* (2013.01); *G06F 40/40* (2020.01); *G06Q 30/0629* (2013.01); *H04L 51/046* (2013.01)

(58) Field of Classification Search
None
See application file for complete search history.

(56) References Cited

U.S. PATENT DOCUMENTS

| | | | |
|---|---|---|---|
| 6,266,649 B1 * | 7/2001 | Linden | G06Q 30/02 705/26.7 |
| 6,801,909 B2 | 10/2004 | Delgado et al. | |
| 8,090,621 B1 * | 1/2012 | Chakrabarti | G06Q 30/0631 705/26.1 |

(Continued)

OTHER PUBLICATIONS

Mell, Peter, et al., The NIST Definition of Cloud Computing, National Institute of Standards and Technology, U.S. Department of Commerce, NIST Special Publication 800-145, Sep. 2011.

(Continued)

*Primary Examiner* — Mila Airapetian
(74) *Attorney, Agent, or Firm* — Ryan, Mason & Lewis, LLP

(57) ABSTRACT

Methods, systems, and computer program products for facilitating user selection using trend-based joint embeddings are provided herein. A method includes obtaining a selection of an item in an online catalog; determining a compatible item of the plurality of items at least in part by providing the selected at least one item and at least one previously selected item corresponding to the user to a trend-based machine learning model, wherein the trend-based machine learning model is trained on historical data associated with the item in the online catalog and fine-tuned based on current trend data from multiple data sources; receiving feedback in response to outputting the at least one compatible item; identifying one or more attributes related to the at least one compatible item based on the feedback; and using the trend-based machine learning model to determine at least one additional compatible item based on the one or more attributes.

20 Claims, 10 Drawing Sheets

(56) References Cited

U.S. PATENT DOCUMENTS

| | | | | |
|---|---|---|---|---|
| 8,250,012 | B1* | 8/2012 | Whitman | G06Q 30/02 |
| | | | | 706/45 |
| 9,286,391 | B1* | 3/2016 | Dykstra | G06F 16/9024 |
| 9,953,358 | B1* | 4/2018 | Robertson | G06Q 30/0631 |
| 10,410,125 | B1* | 9/2019 | Finkelstein | G06N 7/01 |
| 2015/0228002 | A1* | 8/2015 | Berger | G06Q 30/0627 |
| | | | | 705/26.63 |
| 2015/0262282 | A1 | 9/2015 | Walti et al. | |
| 2015/0363859 | A1* | 12/2015 | Zhang | G06Q 30/0631 |
| | | | | 705/26.7 |
| 2017/0365011 | A1 | 12/2017 | McIlroy et al. | |
| 2018/0089541 | A1* | 3/2018 | Stoop | G06V 20/30 |
| 2019/0205646 | A1 | 7/2019 | Piramuthu et al. | |
| 2020/0104898 | A1* | 4/2020 | Cui | G06Q 30/0633 |
| 2021/0248656 | A1* | 8/2021 | Makowsky | G06N 20/00 |
| 2022/0114481 | A1* | 4/2022 | Yang | G06N 5/045 |
| 2023/0111745 | A1* | 4/2023 | Kruck | G06Q 30/0631 |
| | | | | 705/26.7 |

OTHER PUBLICATIONS

Veit, Andreas, et al., "Learning Visual Clothing Style with Heterogeneous Dyadic Co-occurrences," arXiv preprint arXiv:1509.07473, Sep. 24, 2015.

Rusu, Andrei A., et al. "Progressive neural networks." arXiv preprint arXiv:1606.04671, Sep. 7, 2016.

O'Donoghue, Brendan, et al. "Combining policy gradient and Q-learning." arXiv preprint arXiv:1611.01626, Nov. 5, 2016.

Ha, David, et al., "Recurrent world models facilitate policy evolution." arXiv preprint arXiv:1809.01999, Sep. 4, 2018.

Chen, Qian, Zhu Zhuo, and Wen Wang. "Bert for joint intent classification and slot filling." arXiv preprint arXiv:1902.10909, Feb. 28, 2019.

Nguyen, Van Duc, Tran Cao Son, and Enrico Pontelli. "Natural Language Generation for Non-Expert Users." arXiv preprint arXiv:1909.08250, Sep. 18, 2019.

Mothilal, Ramaravind K., et al., "Explaining machine learning classifiers through diverse counterfactual explanations." Proceedings of the 2020 Conference on Fairness, Accountability, and Transparency, Jan. 27, 2020.

Ak, Kenan E., et al. "Fashionsearchnet: Fashion search with attribute manipulation." Proceedings of the European Conference on Computer Vision (ECCV) Workshops. 2018.

Iwata, Tomoharu, et al., "Fashion coordinates recommender system using photographs from fashion magazines." Twenty-Second International Joint Conference on Artificial Intelligence. 2011.

Kim, Joo-Kyung, et al. "Intent detection using semantically enriched word embeddings." 2016 IEEE Spoken Language Technology Workshop (SLT). IEEE, Dec. 13, 2016.

Kim, Eric, et al., Introducing Complete the Look: a scene-basedcomplementary recommendation system, Pinterest Engineering, available at https://medium.com/pinterest-engineering/introducing-complete-the-look-a-scene-based-complementary-recommendation-system-eb891c3fe88, last accessed Dec. 6, 2021, Published Jun. 14, 2019.

Liu, Si, et al. "Hi, magic closet, tell me what to wear!." Proceedings of the 20th ACM international conference on Multimedia, Oct. 29, 2012.

Sokol, Kacper, et al., "Counterfactual explanations of machine learning predictions: opportunities and challenges for AI safety." SafeAI@ AAAI, Jan. 1, 2019.

Ak, Kenan E., et al. "Efficient multi-attribute similarity learning towards attribute-based fashion search." 2018 IEEE Winter Conference on Applications of Computer Vision (WACV). IEEE, Mar. 12, 2018.

Dei, W., et al. "Style Finder: Fine-Grained Clothing Style Recognition and Retrieval." Computer Vision and Pattern Recognition (CVPR), Apr. 2013.

Li, Eileen, et al. "Bootstrapping Complete The Look at Pinterest." Proceedings of the 26th ACM SIGKDD International Conference on Knowledge Discovery & Data Mining, Aug. 23, 2020.

Hahn, Meera, Andrew Silva, and James M. Rehg. "Action2vec: A crossmodal embedding approach to action learning." arXiv preprint arXiv:1901.00484, Jan. 2, 2019.

Zeng, Donghuo, and Keizo Oyama. "Learning Joint Embedding for Cross-Modal Retrieval." 2019 International Conference on Data Mining Workshops (ICDMW). IEEE, Nov. 8, 2019.

Sadeh, Gil, et al. "Joint visual-textual embedding for multimodal style search." arXiv preprint arXiv:1906.06620, Jun. 15, 2019.

Goyal, Yash, et al. "Counterfactual visual explanations." International Conference on Machine Learning. PMLR, May 21, 2019.

Priyadarshini, Aurosikha, The Complete Guide on Conversational Commerce, Kore.ai, Inc., available at https://blog.kore.ai/the-complete-guide-on-conversational-commerce, last accessed Dec. 6, 2021.

* cited by examiner

FACILITATING USER SELECTION USING TREND-BASED JOINT EMBEDDINGS

BACKGROUND

The present application generally relates to information technology and, more particularly, to machine learning (ML) techniques.

ML models may be trained on historical data to learn associations between different items. Output of ML models are used to enhance user interfaces by identifying and displaying relevant items for a user based on the learned associations.

SUMMARY

In one embodiment of the present disclosure, techniques for facilitating user selections using trend-based joint embeddings are provided. An exemplary computer-implemented method includes obtaining a selection from a user of at least one of a plurality of items in an online catalog; determining at least one compatible item of the plurality of items at least in part by providing the selected at least one item and at least one previously selected item corresponding to the user to a trend-based machine learning model, wherein the trend-based machine learning model is trained on historical data associated with the plurality of items and fine-tuned based on current trend data from multiple data sources in multiple different modalities; receiving feedback from the user in response to outputting the at least one compatible item; identifying one or more attributes related to the at least one compatible item based at least in part on the feedback; and using the trend-based machine learning model to determine at least one additional compatible item based at least in part on the one or more attributes.

Another embodiment of the present disclosure or elements thereof can be implemented in the form of a computer program product tangibly embodying computer readable instructions which, when implemented, cause a computer to carry out a plurality of method steps, as described herein. Furthermore, another embodiment of the present disclosure or elements thereof can be implemented in the form of a system including a memory and at least one processor that is coupled to the memory and configured to perform noted method steps. Yet further, another embodiment of the present disclosure or elements thereof can be implemented in the form of means for carrying out the method steps described herein, or elements thereof; the means can include hardware module(s) or a combination of hardware and software modules, wherein the software modules are stored in a tangible computer-readable storage medium (or multiple such media).

These and other objects, features and advantages of the present disclosure will become apparent from the following detailed description of illustrative embodiments thereof, which is to be read in connection with the accompanying drawings.

DETAILED DESCRIPTION

Figure 1:
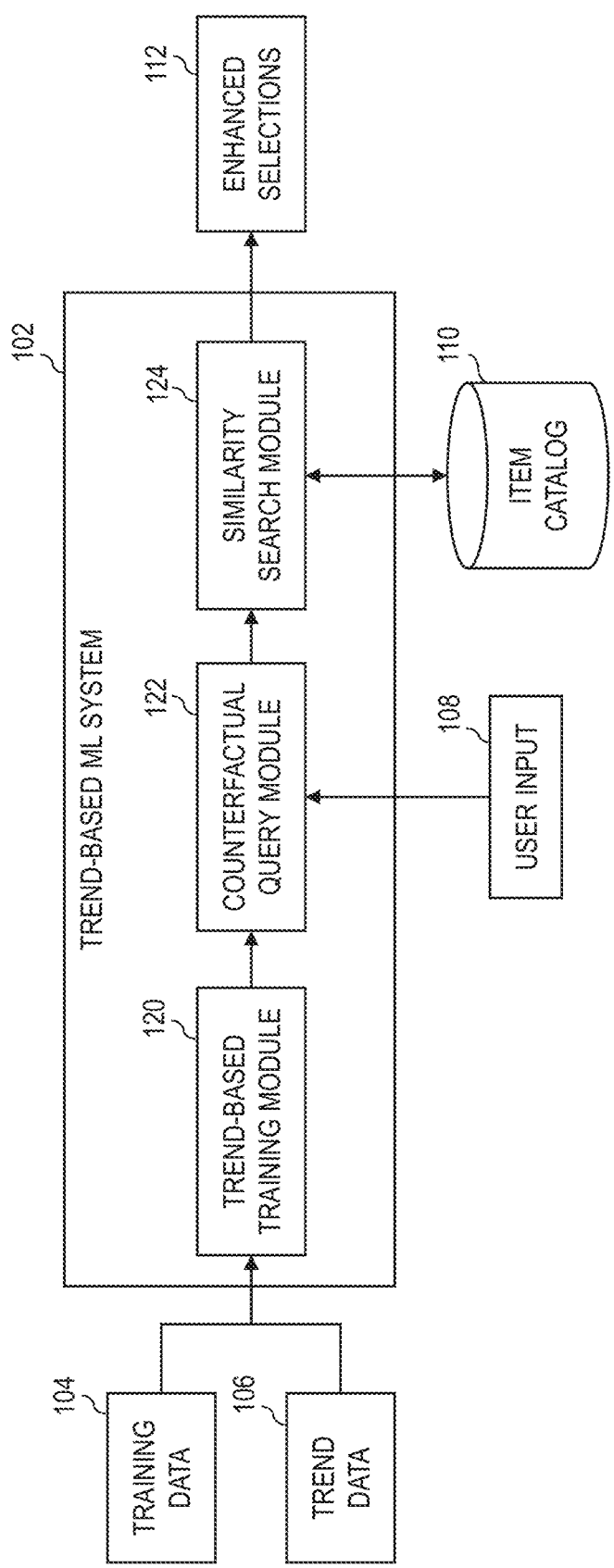
FIG. 1 is a diagram illustrating a system architecture in accordance with exemplary embodiments.

User interfaces frequently use conversation engines or chatbots to enhance user experience. For example, in the fashion and retail industries, there are often online catalogs that include large amounts of products. Identifying and displaying relevant items from such catalogs is typically difficult. Some user interfaces utilize conversation engines or chatbots to enhance the shopping experience by suggesting an item for a user based on the likelihood the user will select or buy. Such suggestions can be based on previous selections or purchases of the user, for example. Techniques related to these concepts include Complete The Look (CTL) and association mining techniques.

Association mining generally relates to learning associations between items or products based on, for example, historical data, such as sales data. As a simple example, 'bread' and 'butter' commonly co-occur in many user bills, and so association mining can assign a high association score among them. Existing CTL techniques utilize deep learning models to learn joint embeddings which represent items in an embedding space, such that items (e.g., of different categories) that occur frequently together in images or historical data would have embeddings that are more similar than items that rarely occur together. Such models are trained using historical data, and thus are not well-suited in industries where trends frequently change. For example, in the fashion industry, trends constantly change, and associations learnt from past data may not be relevant to the current scenario. Also, it is assumed the data used to train and fine-tune such models are in the same format, scheme, or modality.

Exemplary embodiments of the present disclosure improve existing techniques by facilitating user selection using trend-based joint embeddings. One example of an embodiment includes an enhanced artificial intelligence-based conversation agent that enhances or changes user selected items by driving a conversation with the user based on current trends and group CTL scores with respect to previously selected items, while also accounting for user-interested attributes. Such enhancements or changes can be made whilst accounting for user interested attributes related to current selections. To achieve a balance with the current trends and group CTL scores, at least some embodiments described herein apply counter factual queries grounded on the user interested attributes.

An example of an embodiment includes fine-tuning a joint embedding model (e.g., a CTL model) based data from multiple different modalities. Such an embodiment also includes discovering gaps between items selected by the user and previously selected and/or purchased products using the joint embeddings derived from the joint embedding model. Also, alternative items can be identified for the user using a counterfactual process, which increases the association score and visual similarity score with the selected products with controlling the number of attribute changes. In some embodiments, if the user provides feedback (e.g., user input) disagreeing with one or more of the suggestions, then relevant attributes can be derived in the selected product and further alternative suggested can be conditioned based on the relevant attributes. The interaction with the user can be based on a natural language conversation agent, and the conversation can continue until the user selects an alternative item or exits the process.

FIG. 1 is a diagram illustrating a system architecture in accordance with exemplary embodiments. By way of illustration, FIG. 1 depicts a trend-based ML system 102 including a trend-based training module 120, a counterfactual query module 122, and a similarity search module 124.

Generally, the trend-based training module 120 uses training data 104 to train a ML model to learn associations between items based on the training data 104. The trend-based training module 120 also obtains trend data 106 and fine-tunes the ML model based on the trend data 106. The counterfactual query module 122 obtains user input 108 (e.g., corresponding to a selection of an item) and determines relevant attributes based on historical data (e.g., a user profile, user preferences, user sales history, and/or previous user inputs or selections). The similarity search module 124 uses the relevant attributes to identify one or more items in an item catalog 110 associated with the user input 108, and outputs the identified items as enhanced selections 112. The functionality associated with each of modules 120, 122, and 124 is discussed in more detail herein.

Also, although modules 120, 122, and 124 are shown as being part of the trend-based ML system 102, it is to be appreciated that in other embodiments, at least a portion of the modules 120, 122, and 124 can be implemented in a separate system. As an example, a separate system can implement the trend-based training module 120, and the trend-based ML system 102 can obtain the trained trend-based ML model from the separate system.

Figure 2:
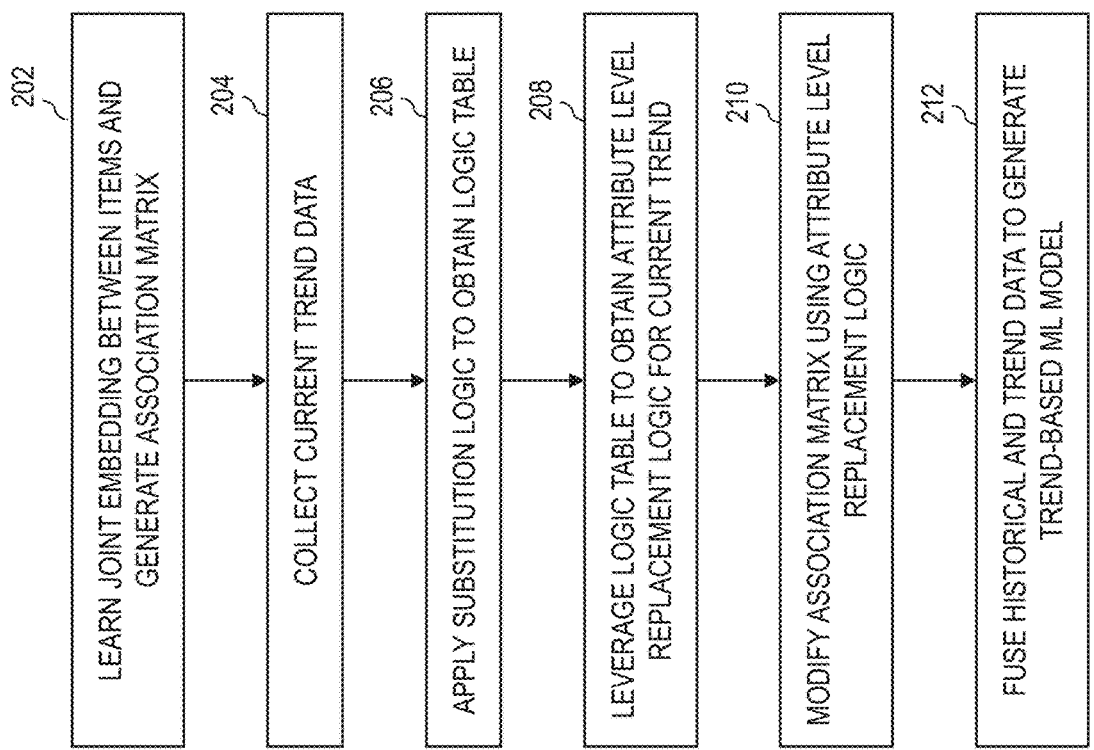
FIG. 2 is a diagram illustrating a process for training a trend-based ML model in accordance with exemplary embodiments.

FIG. 2 is a diagram illustrating a process for training a trend-based ML model in accordance with exemplary embodiments.

Step 202 includes learning joint embeddings between items of a database or catalog (e.g., item catalog 110). For example, in some embodiments step 202 can include obtaining training data, which can be text-based and/or image-based historical data. The training data can then be fed to a joint embedding algorithm to obtain a joint embedding vector space of various attributes. Embedding vectors across different categories have smaller cosine distance if related in the training data (e.g., if the items corresponding to the embedding vectors are paired). In the case of textual data, an association matrix can be obtained after the joint-embedding model is trained.

Figures 3A, 3B:
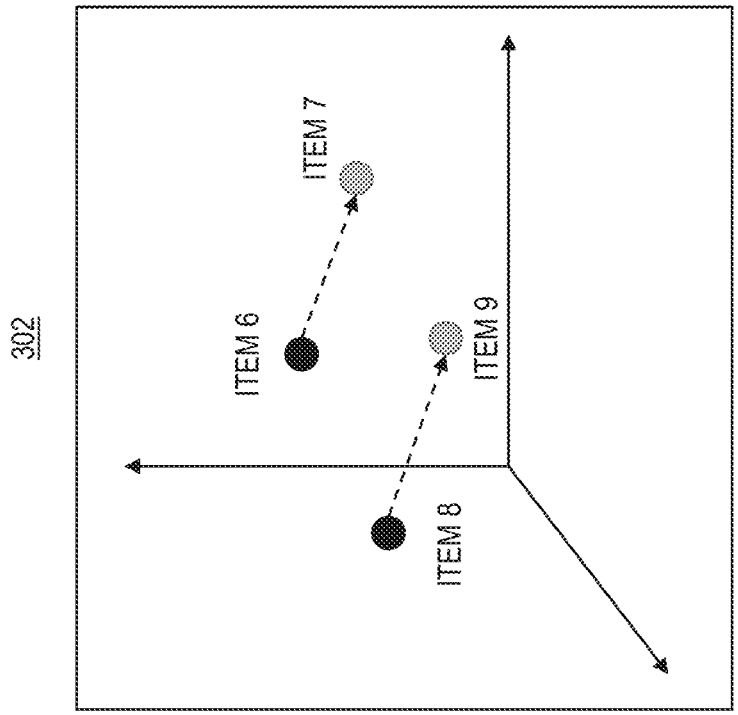
FIG. 3A shows a diagram illustrating an association matrix and FIG. 3B shows a corresponding vector space in accordance with exemplary embodiments.

FIG. 3A shows an example of an association matrix in accordance with illustrative embodiments. The association matrix 300 in FIG. 3A includes items 1, 2, 4, 6, and 8 in the first column (P1) that are paired with items 2, 3, 5, 7, and 9 in the second column (P2). In some examples, the items may correspond to apparel or clothing items (e.g., item 1 may correspond to an embedding for a grey round neck t-shirt, item 2 may correspond to an embedding for blue jeans, item 3 may correspond to canvas shoes, etc.). Thus, it is to be understood P1 complements P2 and vice versa. FIG. 3B shows a representation of a vector space corresponding to items in the association matrix. In this example, the vector space 302 includes the embeddings for items 6 and 7 and items 8 and 9 in the last two rows of association matrix 300. The dashed arrows in the vector space 302 represent the distance between the respective embeddings.

Referring again to FIG. 2, step 204 includes collecting current trend data. As an example, the current trend data from multiple sources, such as, data from one or more social media sites, data from one or more subject matter experts, sales data over a specified time-period; or data indicating co-occurrence of items. Step 204 may include processing the trend data to organize the data at an attribute level. As an example, the processing may include the following steps:
1. Determining the number of times that a particular item feature appears in, for example, in sales data or user shopping history.
2. Using one or more criteria from subject matter experts to select features that are expected to be more relevant for a given group of users.
3. Determining social media metrics (e.g., a number of likes, follows, repost, and/or hashtags) for a particular item feature.

For example, one or more posts on a social media platform can explicitly mention certain attributes. As another example, all attributes of an image can be considered if a number of likes is used as the social media metric.

The output of step 204 may rank attributes according to the metrics above. As an example, consider a set of attributes that includes color, t-shirts, and footwear. The process can rank category's values corresponding to these attributes based on the current trends (e.g., the ranking of colors may be: red, olive, green, purple, blue; the ranking of t-shirts may be: V-neck, round neck, collared; and the ranking of footwear may be: sneakers, derby shoes, canvas, pump shoes). In some embodiments, written descriptions of the trending attributes may also be created based on the ranks (e.g., "Red is trending more than Olive.").

It is to be appreciated that the trend data collected at step 204 can be in different modalities. Such data is typically not useful for finetuning the joint embeddings. For example, data collected from crawling social media sites may be provided as an association matrix across attribute values in the same attribute category (e.g., blue goes well with green, tops go well with jeans, etc.); rules defined by SMEs and may be formatted in natural language; sales data may be formatted to indicate current sales trends across different products; and co-occurrence data may be collected from user histories or profiles (e.g., corresponding to past purchases or virtual shopping carts that include information with which various products complement or co-occur together. The output of step 204, in some embodiments, may be formatted as an attribute trend affinity table.

Step 206 may include applying substitution logic to obtain a logic table. Obtaining the logic table, in some embodiments, includes identifying attributes or categories that are substitutable based on one or more relevant taxonomies. For example, if the items relate to the fashion industry, then step 206 can include deriving a substation logic output table based on the following inputs: a fashion taxonomy, the association matrix from step 202, and one or more similarity rules (e.g., corresponding to color or human aesthetic sense).

By way of example, assume an association matrix indicates the following items as being related: (1) "tie" and "white shirt and black pants"; (2) "V-neck T-shirt" and "red shorts"; and (3) "round neck T-shirt" and "red shorts." In such an example, a fashion taxonomy (or similarity rule) may indicate that a tie goes with formal or semi-formal wear. Accordingly, a decision can be made that the "white shirt and black pants" that are paired with the tie in the association matrix are also formal or semi-formal wear. Similarly, a fashion taxonomy may indicate that shorts are informal, and thus a decision can be made that the V-neck T-shirt is also informal. Since both the V-neck t-shirt and the round neck t-shirt are paired with red shorts, and it has already been determined that the V-neck t-shirt is informal, then a decision can also be made that the round neck-shirt is informal wear. Colors that are similar to red (e.g., based on hue or value) can be determined (e.g., magenta) using one or more color-similarity rules. A substitution logic table can be deduced based on these decisions. For this example, a substitution logic table may be as follows:

TABLE 1

| Feature | Allowed Substitution Logic |
| --- | --- |
| Shirt | Formal/semi-formal upper wear |
| Pants | Formal/semi-formal lower wear |
| Round neck t-shirt | Informal upper wear |
| V-neck t-shirt | Informal upper wear |
| Shorts | Informal lower wear |
| Green | Olive/Dark Green |

Step 208 includes leveraging the substation logic table to obtain attribute level replacement logic for a current trend. For example, the logic table generated at step 206 and the processed trend data organized at the attribute level from step 204 may be provided as input at step 208 to perform substitutions. By way of example, step 208 may include modifying Table 1 with one or more additional columns showing the substitutions that were made and output the modified table. In such an example, a round neck t-shirt may be selected replacement for the V-neck t-shirt in Table 1 based at least in part on the indication that round neck t-shirts are ranked higher than V-neck t-shirts according to the processed trend data.

Step 210 includes modifying the association matrix using the attribute level replacement logic form steps 206 and 208. More specifically, the attribute level replacement logic can be used to substitute items in the association matrix with the trendier alternatives. If we let Pi(x) be any element belonging to ith column and xth row of association matrix, then a process for modifying the association matrix, in at least some embodiments, includes the following process:
1. Find substitution logic for $P_i(x)$ from the logic table obtained at step 206 (referred to as Logic A), and let $P_i(x)$ belong to an attribute y.
2. Start to select elements in decreasing order of trendiness based on the ranking for attribute y.
3. Stop selecting elements when the logic of the selected element matches logic A.
4. Substitute $P_i(x)$ with the selected element of step 3.
5. Optionally, substitute $P_i(x)$ with other elements in the attribute level replacement logic table obtained in step 208 having logic A (it is noted that the other elements would have a lower priority as compared to the element of step 4 for generating recommendation).

Step 212 includes fusing the historical data and trend data to generate a trend-based ML model. For example, step 212 may include obtaining the modified association matrix from step 210, applying a joint embedding algorithm (such as a progressive neural network algorithm) to learn a new joint embedding space, and applying a reinforcement learning and/or a counter fitting process to increase the reward and decrease the error in learning the joint embeddings, as described in more detail elsewhere herein.

Figure 4:
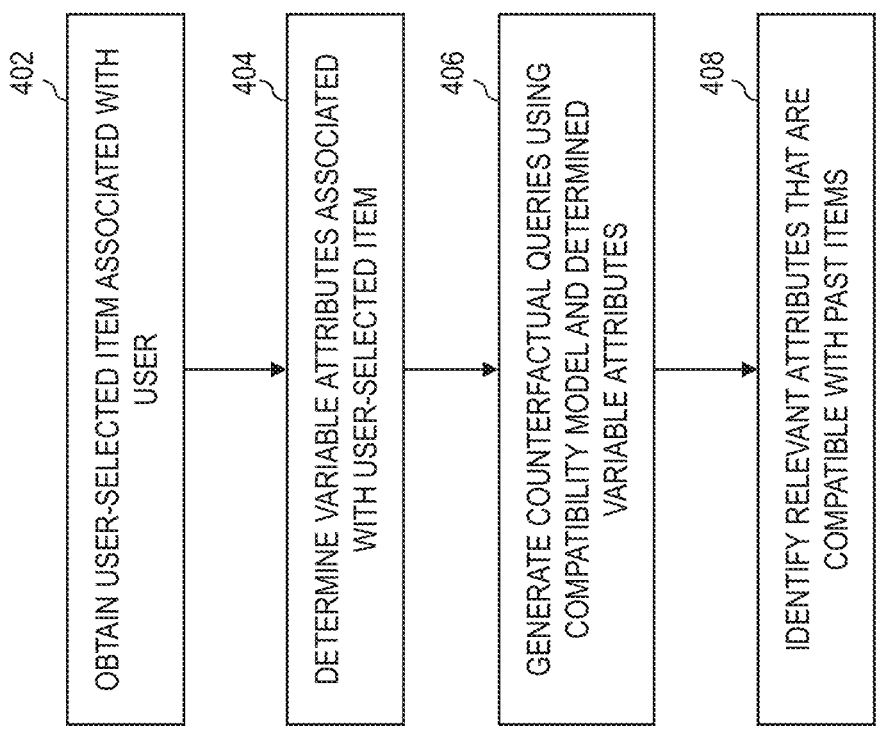
FIG. 4 is a diagram illustrating a counterfactual query process in accordance with exemplary embodiments.

FIG. 4 is a diagram illustrating a counterfactual query process in accordance with exemplary embodiments. The process in FIG. 4 may be implemented by the counterfactual query module 122 in FIG. 1, for example. Step 402 includes obtaining a user-selected item associated with the user.

Step 404 includes determining a set of variable attributes associated with the user-selected item. Generally, the variable attributes correspond to attributes whose values are allowed to be changed. Such attributes can be determined by identifying keywords associated with the selection of the item.

Step 406 includes generating counterfactual queries using compatibility model and the determined variable attributes. For example, a trend-based ML model that is trained in accordance with FIG. 2 may be wrapped into the compatibility model. The compatibility model takes the user-selected item as input and returns a cosine distance with one or more other item that are related to the user (e.g., the items may correspond to historical items identified based on a profile of the profile or past user behavior such as purchase history). In some embodiments, the compatibility model may output a compatibility score based on the cosine distance between the embedding of the user-selected item and the embedding of at least one of the other items related to the user. The compatibility model, in some embodiments, is provided as a black box model to a counterfactual engine along with a set of variable attributes to generate counterfactual queries. Step 408 includes identifying relevant attributes that are compatible with the past items. The relevant attributes may be identified by generating counterfactual queries that increase the overall compatibility score with the user-selected item.

Figure 5:
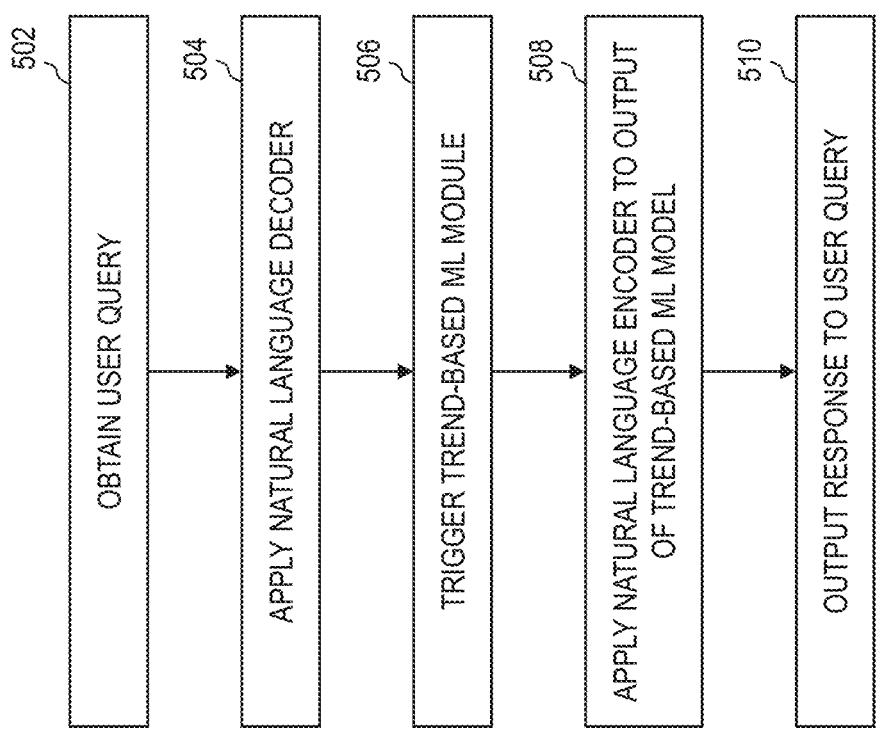
FIG. 5 is a diagram illustrating a process of a conversation agent in accordance with exemplary embodiments.

FIG. 5 is a diagram illustrating a process of a conversation agent in accordance with exemplary embodiments. Step 502 includes obtaining a user query, which in this example is assumed to be a natural language user query. Step 504 includes applying a natural language decoder. For example, the natural language decoder may be applied to parse the natural language query into keywords and intent. Step 506 includes triggering a trend-based module that utilizes a ML model (e.g., a trend-based ML model trained in accordance with the process in FIG. 2). For example, the trend-based module may be triggered based on the intent determined at step 504, and applied to the keywords. In some examples, the conversation agent may correspond to a virtual shopping assistant, and the trend-based model may be selected (and triggered) from among various other modules such as a search module, recommender module, and transaction module associated with the conversation agent. Step 508 includes applying a natural language encoder that converts output of trend-based module into a natural language format. Step 510 includes outputting a response to the user query based on the encoded output.

Figure 6:
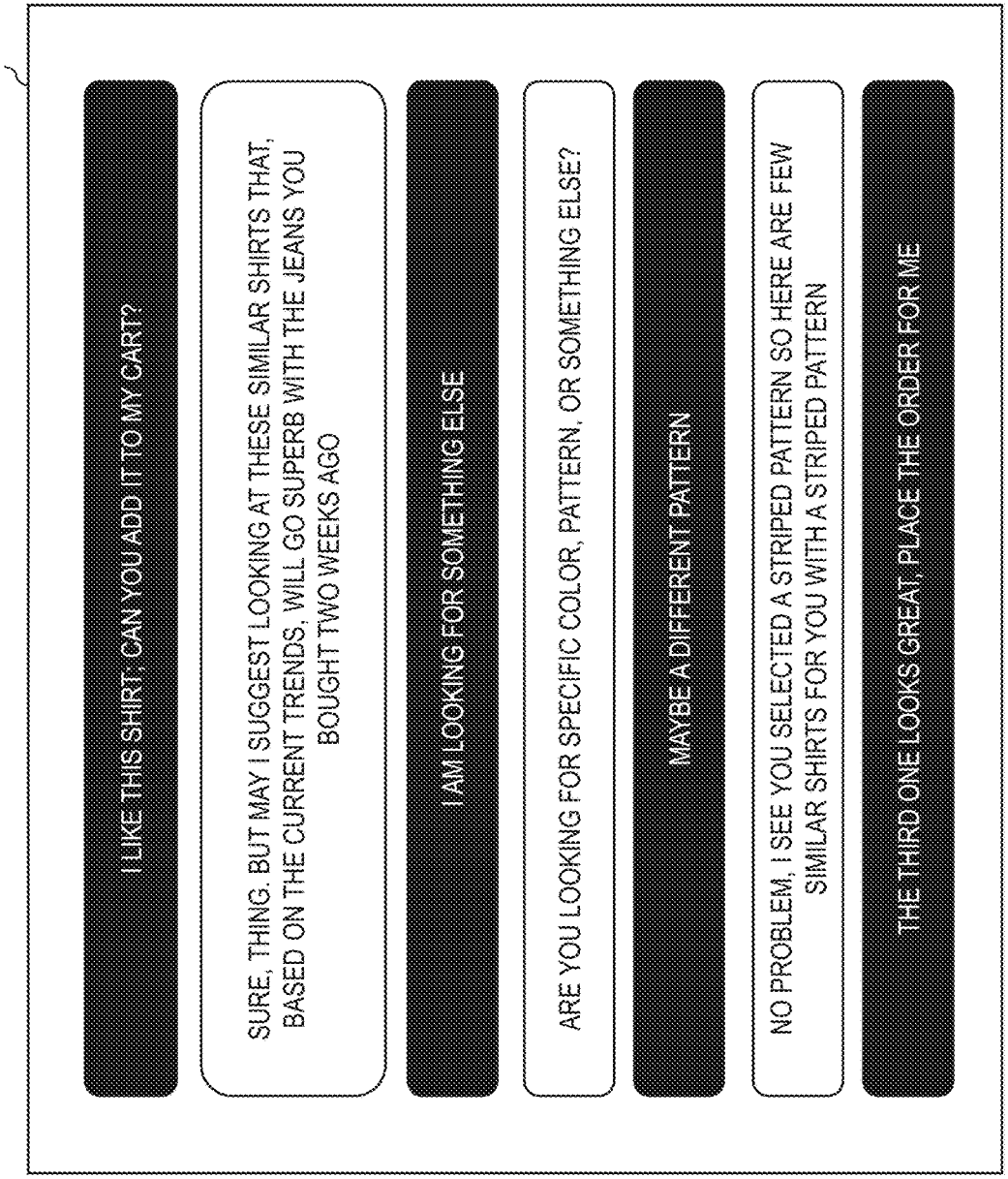
FIG. 6 is a diagram illustrating user interaction in accordance with exemplary embodiments.

FIG. 6 is a diagram illustrating user interaction 600 in accordance with exemplary embodiments. In the example shown in FIG. 6, the user interaction 600 is assumed to be between a conversation agent (corresponding to the darker portions of the user interaction) and a user (corresponding to the lighter portions of the user interaction). In this example, the conversation agent is assumed to utilize the techniques described herein to drive the conversation with the user.

Figure 7:
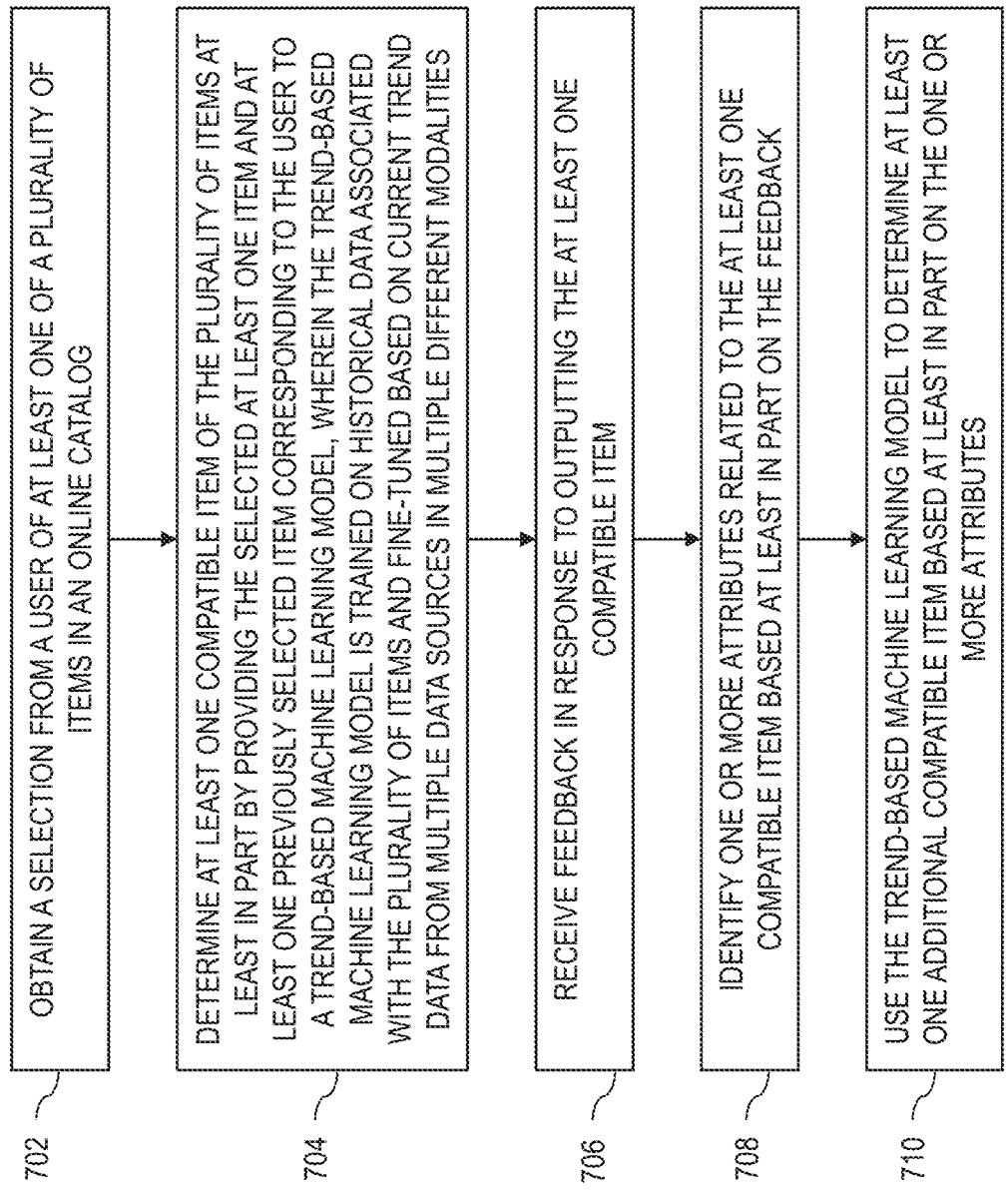
FIG. 7 is a flow diagram illustrating techniques for facilitating user interaction in accordance with exemplary embodiments.

FIG. 7 is a flow diagram illustrating techniques in accordance with exemplary embodiments. Step 702 includes obtaining a selection from a user of at least one of a plurality of items in an online catalog. Step 704 includes determining at least one compatible item of the plurality of items at least in part by providing the selected at least one item and at least one previously selected item corresponding to the user to a trend-based machine learning model, wherein the trend-based machine learning model is trained on historical data associated with the plurality of items and fine-tuned based on current trend data from multiple data sources in multiple different modalities. Step 706 includes receiving feedback from the user in response to outputting the at least one compatible item. Step 708 includes identifying one or more attributes related to the at least one compatible item based at least in part on the feedback. Step 710 includes using the trend-based machine learning model to determine at least one additional compatible item based at least in part on the one or more attributes.

The selection from the user and the feedback from the user may be provided in a natural language format. The selection of the user may be processed using a natural language decoder of a software agent that determines one or more keywords of the user selection. The providing may include transforming the one or more keywords into a format that is processable by the trend-based machine learning model. The trend-based machine learning model may be trained to learn joint embeddings between items such that, for a given embedding provided as input, the trend-based machine learning model outputs a similar embedding of an item in a different category than the first item. The current trend data may include at least two of: data from one or more online social media sites; data from one or more subject matter experts; sales data over a specified time-period; and co-occurrence of items with a plurality of users. The at least one previously selected item may include an item identified based on at least one of a profile of the user or a purchase history of the user. The identifying may include applying a counterfactual query process that perturbs at least one attribute of the selected item based on the feedback to increase a compatibility score with the at least one previously selected item. The compatibility score may be calculated based on a cosine distance between embeddings of counterfactual queries generated by the counterfactual process and embeddings of the at least one previously selected item. The at least one item may include a product having a first type and the at least one compatible product comprises another product having a different, second type that is related to the first type. Each of the first type and the second type may be a type of apparel.

The techniques depicted in FIG. 7 can also, as described herein, include providing a system, wherein the system includes distinct software modules, each of the distinct software modules being embodied on a tangible computer-readable recordable storage medium. All of the modules (or any subset thereof) can be on the same medium, or each can be on a different medium, for example. The modules can include any or all of the components shown in the figures and/or described herein. In an embodiment of the present disclosure, the modules can run, for example, on a hardware processor. The method steps can then be carried out using the distinct software modules of the system, as described above, executing on a hardware processor. Further, a computer program product can include a tangible computer-readable recordable storage medium with code adapted to be executed to carry out at least one method step described herein, including the provision of the system with the distinct software modules.

Additionally, the techniques depicted in FIG. 7 can be implemented via a computer program product that can include computer useable program code that is stored in a computer readable storage medium in a data processing system, and wherein the computer useable program code was downloaded over a network from a remote data processing system. Also, in an embodiment of the present disclosure, the computer program product can include computer useable program code that is stored in a computer readable storage medium in a server data processing system, and wherein the computer useable program code is downloaded over a network to a remote data processing system for use in a computer readable storage medium with the remote system.

An exemplary embodiment or elements thereof can be implemented in the form of an apparatus including a memory and at least one processor that is coupled to the memory and configured to perform exemplary method steps.

Figure 8:
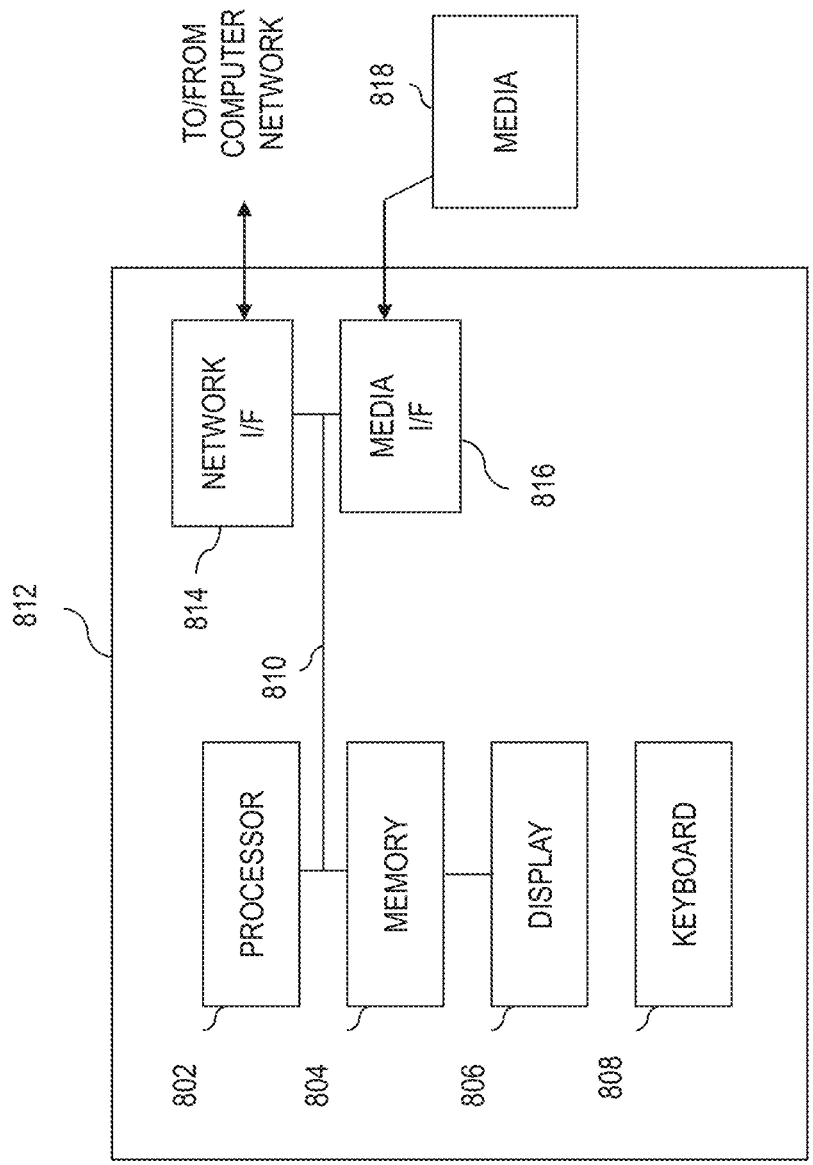
FIG. 8 is a system diagram of an exemplary computer system on which at least one embodiment of the present disclosure can be implemented.

Additionally, an embodiment of the present disclosure can make use of software running on a computer or workstation. With reference to FIG. 8, such an implementation might employ, for example, a processor 802, a memory 804, and an input/output interface formed, for example, by a display 806 and a keyboard 808. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, a mechanism for inputting data to the processing unit (for example, mouse), and a mechanism for providing results associated with the processing unit (for example, printer). The processor 802, memory 804, and input/output interface such as display 806 and keyboard 808 can be interconnected, for example, via bus 810 as part of a data processing unit 812. Suitable interconnections, for example via bus 810, can also be provided to a network interface 814, such as a network card, which can be provided to interface with a computer network, and to a media interface 816, such as a diskette or CD-ROM drive, which can be provided to interface with media 818.

Accordingly, computer software including instructions or code for performing the methodologies of the present disclosure, as described herein, may be stored in associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 802 coupled directly or indirectly to memory elements 804 through a system bus 810. The memory elements can include local memory employed during actual implementation of the program code, bulk storage, and cache memories which provide temporary storage of at least some program code in order to reduce the number of times code must be retrieved from bulk storage during implementation.

Input/output or I/O devices (including, but not limited to, keyboards 808, displays 806, pointing devices, and the like) can be coupled to the system either directly (such as via bus 810) or through intervening I/O controllers (omitted for clarity).

Network adapters such as network interface 814 may also be coupled to the system to enable the data processing system to become coupled to other data processing systems or remote printers or storage devices through intervening private or public networks. Modems, cable modems and Ethernet cards are just a few of the currently available types of network adapters.

As used herein, including the claims, a "server" includes a physical data processing system (for example, system 812 as shown in FIG. 8) running a server program. It will be understood that such a physical server may or may not include a display and keyboard.

An exemplary embodiment may include a system, a method, and/or a computer program product at any possible technical detail level of integration. The computer program product may include a computer readable storage medium (or media) having computer readable program instructions thereon for causing a processor to carry out exemplary embodiments of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform embodiments of the present disclosure.

Embodiments of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It should be noted that any of the methods described herein can include an additional step of providing a system comprising distinct software modules embodied on a computer readable storage medium; the modules can include, for example, any or all of the components detailed herein. The method steps can then be carried out using the distinct software modules and/or sub-modules of the system, as described above, executing on a hardware processor 802. Further, a computer program product can include a computer-readable storage medium with code adapted to be implemented to carry out at least one method step described herein, including the provision of the system with the distinct software modules.

In any case, it should be understood that the components illustrated herein may be implemented in various forms of hardware, software, or combinations thereof, for example, application specific integrated circuit(s) (ASICS), functional circuitry, an appropriately programmed digital computer with associated memory, and the like. Given the teachings provided herein, one of ordinary skill in the related art will be able to contemplate other implementations of the components.

Additionally, it is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (for example, networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (for example, country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (for example, storage, processing, bandwidth, and active user accounts). Resource usage can be monitored, controlled, and reported providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (for example, web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (for example, host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (for example, mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (for example, cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 9:
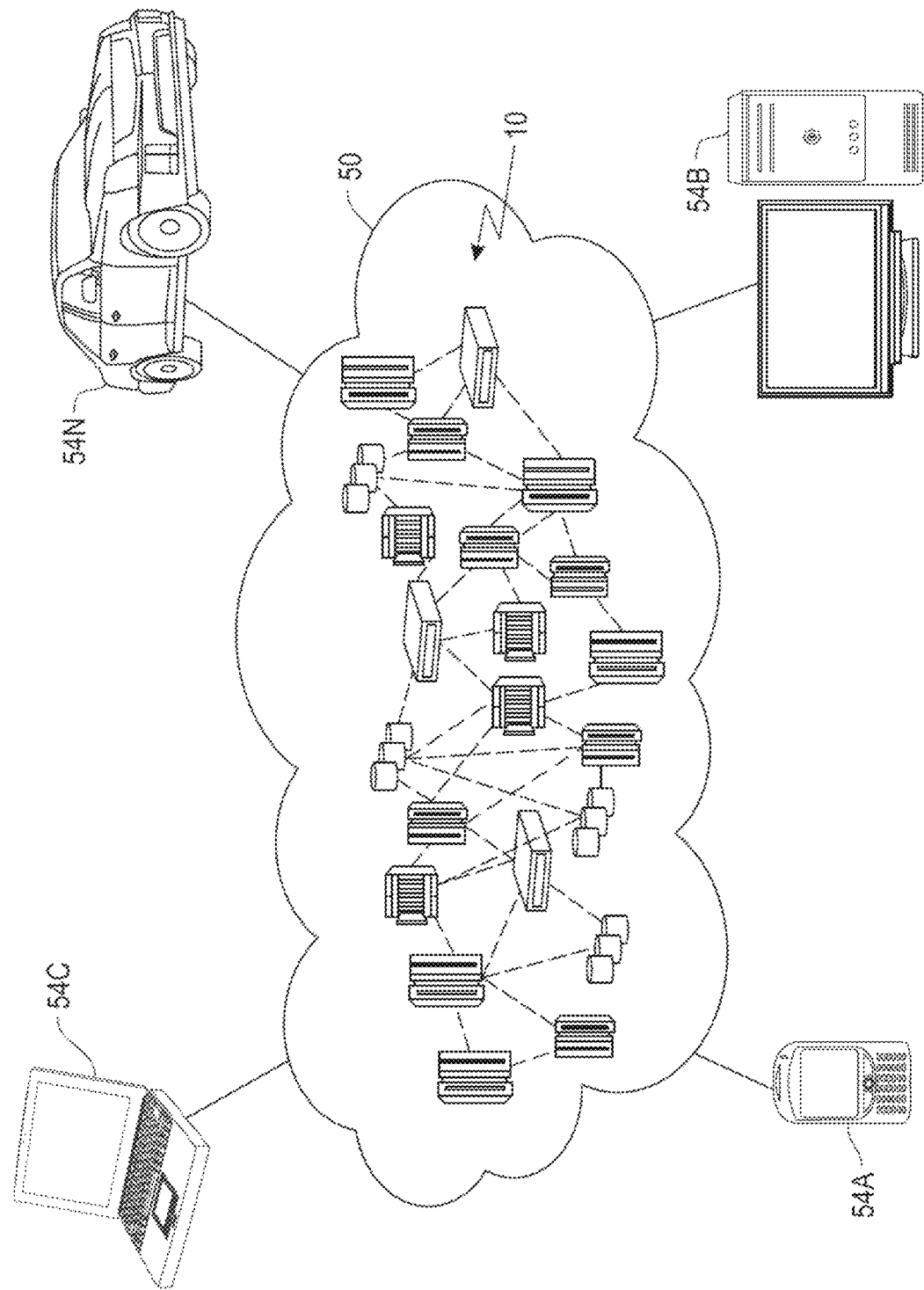
FIG. 9 depicts a cloud computing environment in accordance with exemplary embodiments.

Referring now to FIG. 9, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 9 are intended to be illustrative only and that computing nodes 10 and cloud computing environment 50 can communicate with any type of computerized device over any type of network and/or network addressable connection (e.g., using a web browser).

Figure 10:
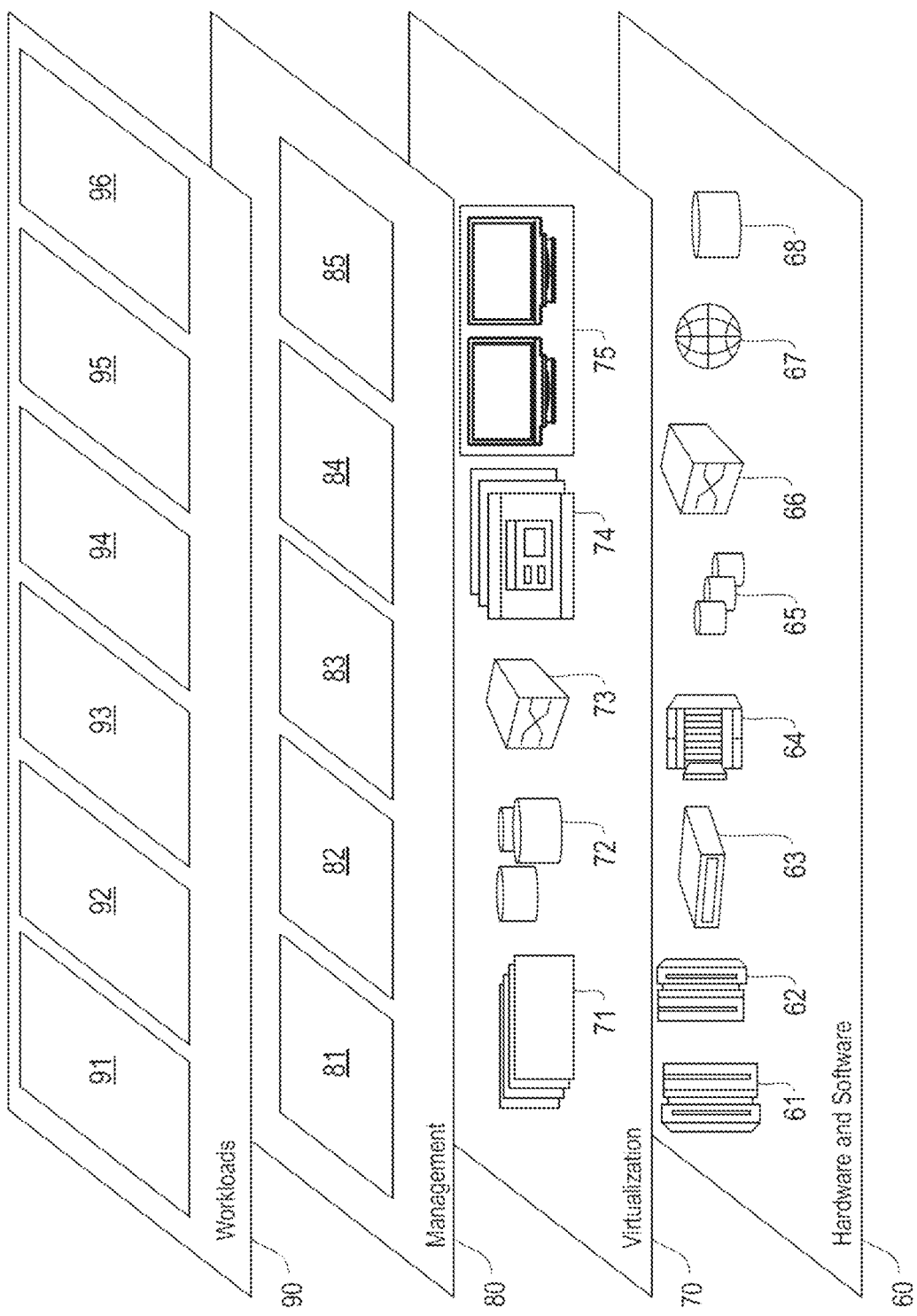
FIG. 10 depicts abstraction model layers in accordance with exemplary embodiments.

Referring now to FIG. 10, a set of functional abstraction layers provided by cloud computing environment 50 (FIG. 9) is shown. It should be understood in advance that the components, layers, and functions shown in FIG. 10 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75. In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources.

In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and facilitating user interaction 96, in accordance with the one or more embodiments of the present disclosure.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of another feature, step, operation, element, component, and/or group thereof.

At least one embodiment of the present disclosure may provide a beneficial effect such as, for example, improved ML models that are fine-tuned based on trend data from multiple modalities.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, the method comprising:
    obtaining a selection from a user of at least one of a plurality of items in an online catalog;
    determining at least one compatible item of the plurality of items in the online catalog at least in part by providing the selected at least one item and at least one previously selected item corresponding to the user to a trend-based machine learning model, wherein the trend-based machine learning model is trained to learn joint embeddings between items such that, for a given embedding provided as input, the trend-based machine learning model outputs a similar embedding of an item, and wherein the trend-based machine learning model is trained on historical data associated with at least a portion of the plurality of items in the online catalog and fine-tuned based on current trend data, from multiple data sources, in multiple different modalities;
    receiving feedback from the user in response to outputting the at least one compatible item;
    identifying one or more attributes related to the at least one compatible item based at least in part on the feedback; and
    using the trend-based machine learning model to determine at least one additional compatible item in the online catalog based at least in part on the one or more attributes;
    wherein the method is carried out by at least one computing device.

2. The computer-implemented method of claim 1, wherein the selection from the user and the feedback from the user are provided in a natural language format.

3. The computer-implemented method of claim 1, wherein the selection of the user is processed using a natural language decoder of a software agent that determines one or more keywords of the user selection, and wherein the providing comprises transforming the one or more keywords into a format that is processable by the trend-based machine learning model.

4. The computer-implemented method of claim 1, wherein the similiar embedding of the item output by the trend-based machine learning model is in a different category than the item corresponding to the given embedding.

5. The computer-implemented method of claim 1, wherein the current trend data comprises at least two of:
data from one or more online social media sites;
data from one or more subject matter experts;
sales data over a specified time-period; and
co-occurrence of items with a plurality of users.

6. The computer-implemented method of claim 1, wherein the at least one previously selected item comprises an item identified based on at least one of a profile of the user or a purchase history of the user.

7. The computer-implemented method of claim 1, wherein the identifying comprises:
applying a counterfactual query process that perturbs at least one attribute of the selected item based on the feedback to increase a compatibility score with the at least one previously selected item.

8. The computer-implemented method of claim 7, wherein the compatibility score is calculated based on a cosine distance between embeddings of counterfactual queries generated by the counterfactual process and embeddings of the at least one previously selected item.

9. The computer-implemented method of claim 1, wherein the at least one item comprises a product having a first type and the at least one compatible product comprises another product having a different, second type that is related to the first type.

10. The computer-implemented method of claim 9, wherein each of the first type and the second type is a type of apparel.

11. The computer-implemented method of claim 1, wherein software is provided as a service in a cloud environment for implementing at least a part of the trend-based machine learning model.

12. A computer program product comprising a computer readable storage medium having program instructions embodied therewith, the program instructions executable by a computing device to cause the computing device to:
obtain a selection from a user of at least one of a plurality of items in an online catalog;
determine at least one compatible item of the plurality of items in the online catalog at least in part by providing the selected at least one item and at least one previously selected item corresponding to the user to a trend-based machine learning model, wherein the trend-based machine learning model is trained to learn joint embeddings between items such that, for a given embedding provided as input, the trend-based machine learning model outputs a similar embedding of an item, and wherein the trend-based machine learning model is trained on historical data associated with at least a portion of the plurality of items in the online catalog and fine-tuned based on current trend data, from multiple data sources, in multiple different modalities;
receive feedback from the user in response to outputting the at least one compatible item;
identify one or more attributes related to the at least one compatible item based at least in part on the feedback; and
use the trend-based machine learning model to determine at least one additional compatible item in the online catalog based at least in part on the one or more attributes.

13. The computer program product of claim 12, wherein the selection from the user and the feedback from the user are provided in a natural language format.

14. The computer program product of claim 12, wherein the selection of the user is processed using a natural language decoder of a software agent that determines one or more keywords of the user selection, and wherein the providing comprises transforming the one or more keywords into a format that is processable by the trend-based machine learning model.

15. The computer program product of claim 12, wherein the similar embedding of the item output by the trend-based machine learning model is in a different category than the item corresponding to the given embedding.

16. The computer program product of claim 12, wherein the current trend data comprises at least two of:
data from one or more online social media sites;
data from one or more subject matter experts;
sales data over a specified time-period; and
co-occurrence of items with a plurality of users.

17. The computer program product of claim 12, wherein the at least one previously selected item comprises an item identified based on at least one of a profile of the user or a purchase history of the user.

18. The computer program product of claim 12, wherein the identifying comprises:
applying a counterfactual query process that perturbs at least one attribute of the selected item based on the feedback to increase a compatibility score with the at least one previously selected item.

19. The computer program product of claim 12, wherein the at least one item comprises a product having a first type and the at least one compatible product comprises another product having a different, second type that is related to the first type.

20. A system comprising:
a memory configured to store program instructions;
a processor operatively coupled to the memory to execute the program instructions to:
obtain a selection from a user of at least one of a plurality of items in an online catalog;
determine at least one compatible item of the plurality of items in the online catalog at least in part by providing the selected at least one item and at least one previously selected item corresponding to the user to a trend-based machine learning model, wherein the trend-based machine learning model is trained to learn joint embeddings between items such that, for a given embedding provided as input, the trend-based machine learning model outputs a similar embedding of an item, and wherein the trend-based machine learning model is trained on historical data associated with at least a portion of the plurality of items in the online catalog and fine-tuned based on current trend data, from multiple data sources, in multiple different modalities;
receive feedback from the user in response to outputting the at least one compatible item;
identify one or more attributes related to the at least one compatible item based at least in part on the feedback; and use the trend-based machine learning model to determine at least one additional compatible item in the online catalog based at least in part on the one or more attributes.

* * * * *